(12) United States Patent
Ekambaram

(10) Patent No.: US 10,873,594 B2
(45) Date of Patent: Dec. 22, 2020

(54) TEST SYSTEM AND METHOD FOR IDENTIFYING SECURITY VULNERABILITIES OF A DEVICE UNDER TEST

(71) Applicant: Rohde & Schwarz GmbH & Co. KG, Munich (DE)

(72) Inventor: Prabhakaran Ekambaram, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 211 days.

(21) Appl. No.: 16/053,472

(22) Filed: Aug. 2, 2018

(65) Prior Publication Data

US 2020/0045073 A1 Feb. 6, 2020

(51) Int. Cl.
*H04L 29/06* (2006.01)
*G06F 1/28* (2006.01)
*H04L 12/26* (2006.01)

(52) U.S. Cl.
CPC ............ *H04L 63/1433* (2013.01); *G06F 1/28* (2013.01); *H04L 43/028* (2013.01); *H04L 43/04* (2013.01); *H04L 43/0888* (2013.01)

(58) Field of Classification Search
CPC ... H04L 63/1433; H04L 43/028; H04L 43/04; H04L 43/0888; G06F 1/28; G06F 21/00
USPC .......................................................... 726/25
See application file for complete search history.

(56) References Cited

U.S. PATENT DOCUMENTS

| 2008/0229415 A1* | 9/2008 | Kapoor | H04L 63/14 726/22 |
| 2013/0347103 A1* | 12/2013 | Veteikis | H04L 43/04 726/22 |
| 2014/0173319 A1* | 6/2014 | Zeng | G06F 11/3409 713/340 |

FOREIGN PATENT DOCUMENTS

| CN | 107146085 A | 9/2017 |
| WO | 2018/084808 A1 | 5/2018 |

* cited by examiner

*Primary Examiner* — Mohammad W Reza
(74) *Attorney, Agent, or Firm* — Christensen O'Connor Johnson Kindness PLLC

(57) ABSTRACT

A test system for identifying security vulnerabilities of a device under test is described, comprising a device under test and a network simulator connected to the device under test, a deep packet inspection engine connected to the network simulator for monitoring IP traffic, a power consumption measurement device connected to the device under test for monitoring the power consumption of the device under test, and a power consumption measurement device connected to the device under test for monitoring the power consumption of the device under test. The network simulator comprising at least one penetration test module for performing at least one penetration test. The over-the-top application analyzer module is adapted to correlate all information gathered to identify an abnormal behavior of the device under test from expected behavior under the conditions applied and to identify at least one security threat. Further, a method for identifying security vulnerabilities of a device under test is described.

20 Claims, 2 Drawing Sheets

TEST SYSTEM AND METHOD FOR IDENTIFYING SECURITY VULNERABILITIES OF A DEVICE UNDER TEST

FIELD OF THE DISCLOSURE

Embodiments of the present disclosure relate generally to a test system for identifying security vulnerabilities of a device under test. Further, embodiments of the present disclosure relate generally to a method for identifying security vulnerabilities of a device under test.

BACKGROUND

In modern telecommunication environments, different user end devices are used that have access to the internet so that the respective user end devices may be generally vulnerable with regard to security issues. User end devices such as mobile end devices typically use different applications running on the user end device which communicate with servers via the internet so that these applications may be misused for attacking the user end device.

The aim of such an attack may be to steel personal data information from the user end device. In addition or alternatively, the user end device may be attacked so as to make the user end device an internet bot, for instance a hacker bot, a spam bot or any other bot controlled by another party, but not the owner of the user end device. Thus, other user end devices may be attacked by the user end device attacked previously and successively. Of course, it is not desired that applications may run on a user end device that can be attacked.

Accordingly, there is a need for a test system as well as a method being capable of identifying security vulnerabilities of a user end device or any other communication device. In some embodiments, applications running on the user end device which might be vulnerable or tampered shall be identified.

SUMMARY

Embodiments of the present disclosure provide a test system for identifying security vulnerabilities of a device under test, comprising:
  a device under test;
  a network simulator connected to the device under test, the network simulator comprising at least one penetration test module for performing at least one penetration test;
  a deep packet inspection engine connected to the network simulator for monitoring IP traffic;
  a power consumption measurement device connected to the device under test for monitoring the power consumption of the device under test; and
  an over-the-top (OTT) application analyzer module, the over-the-top application analyzer module being adapted to correlate all information gathered to identify an abnormal behavior of the device under test from expected behavior under the conditions applied and to identify at least one security threat.

Further, embodiments of the present disclosure provide a method for identifying security vulnerabilities of a device under test, with the following steps:
  providing a test system for identifying security vulnerabilities of a device under test, the test system comprising a device under test, a network simulator connected to the device under test, a deep packet inspection engine connected to the network simulator for monitoring IP traffic, a power consumption measurement device connected to the device under test for monitoring the power consumption of the device under test, and an over-the-top application analyzer module, wherein the network simulator comprises at least one penetration test module for forming at least one penetration test;
  performing at least one penetration test on the device under test; and
  collecting information, analyzing the information collected so as to identify an abnormal behavior of the device under test from expected behavior under the conditions applied and to identify at least one security threat.

Accordingly, a test system as well as a method are provided that are capable of identifying security vulnerabilities of a device under test, for instance a mobile user end device or a base station or any other communication device. The test system as well as the method ensure that penetration tests of the device under test may be performed in order to simulate an attack on the device under test. Well performing the dedicated attacks, namely the penetration tests, information from the components of the test system are gathered which information is correlated and analyzed by the over-the-top application (OTT application) analyzer module in order to identify an abnormal behavior of the device under test. The abnormal behavior can be identified as an expected behavior under the conditions applied is known. Hence, the information gathered is compared internally with information stored and/or gathered previously so as to determine a regular behavior. When an abnormal behavior was identified, a security threat may have been identified.

The conditions applied may relate to the testing parameters used or rather collected by the components of the test system, namely the device under test itself, the network simulator, the deep packet inspection engine and/or the power consumption measurement device.

Since a network simulator is used, different network conditions, for example different network environments, may be simulated to which the device under test is connected. Accordingly, it is possible to test the device under test under certain and different circumstances wherein the particular circumstances, namely the specific network environment, may be defined via the network simulator.

The at least one penetration test module may be a software module running on the network simulator so as to provide a penetration test tool via which an operator may simulate different attacks or scenarios for attacks in order to test the device under test.

The operator may further configure testing scenarios so that different attacks may be simulated in a subsequent manner and/or in parallel.

The scenario may be run automatically once it has been activated by the operator.

According to an aspect, the conditions applied comprise at least one of network operating parameters, data throughput, and power consumption.

The network operation parameters are set by the network simulator or rather used by the network simulator. For instance, the network parameters may be defined by an operator of the test system in order to test the device under test with regard to a certain network environment.

Furthermore, the data throughput, namely the IP traffic, is monitored by the deep packet inspection engine that is connected to the network simulator. Hence, the data traffic is a parameter that might reveal an attack.

The power consumption may relate to the power consumption of the device under test during the respective penetration test or rather attack simulated by the test system. Hence, it might be verified whether or not the device under test has a higher power consumption due to the attack, for instance a successful attack. In general, the power consumption of the device under test is also taken into account as a parameter.

Furthermore, the security threat may comprise at least one of spoofing of personal data information and communication to a server trying to make the device under test an internet bot. For instance, the internet bot may be a hacker bot or a spam bot that is used to identify vulnerabilities in webpages. Moreover, personal data information may be spoofed so as to obtain access to protected contents.

According to an aspect, an application is provided that runs on the device under test. In other words, an application is running on the device under test. The application running on the device under test may gather further information that is used by the over-the-top application analyzer module for identifying abnormal behavior of the device under test and/or to identify a security threat.

As the application is running on the device under test, information regarding the device under test may be gathered by the application that communicates with the OTT application analyzer module.

Thus, the application may be an application for data collection. The data collected is forwarded to OTT application analyzer module so that the OTT application analyzer module is enabled to correlate all information gathered, namely the information from all components of the test system.

The over-the-top application analyzer module may be adapted to execute the application on the device under test. Thus, the application running on the device under test may be controlled by the over-the-top application analyzer module so that different programs and/or routines may be executed on the device under test due to a control signal outputted by the over-the-top application analyzer module. Therefore, the OTT application analyzer module is enabled to control the information obtained from the application running on the device under test.

For instance, the application forwards information through the network simulator to the over-the-top application analyzer module. The OTT application analyzer module and the application may communicate with each other via the network provided by the network simulator. Therefore, the network provided by the network simulator is used for data transfer as well as testing purposes.

Another aspect provides that the over-the-top application analyzer module is adapted to receive information of at least one of the deep packet inspection engine, the network simulator, the power consumption measurement device, and the application. Therefore, the respective components of the test system may be connected (wirelessly and/or via wires) with the over-the-top application analyzer module directly or indirectly so as to forward the information gathered.

The respective connections may be provided by radio frequency connections, for instance the connection between the device under test and the network simulator. Alternatively or additionally, the connections may be established by lines and/or cables.

The over-the-top application analyzer module may be adapted to receive information regarding at least one of IP security, cyber security attack, signaling, application, the device under test itself as well as its vulnerabilities, and power consumption. The respective information forwarded to the over-the-top application analyzer module may be forwarded by the components of the test system.

The network simulator may forward information regarding the IP security and/or cyber security attack, for instance host name and/or (destination) IP address.

Information with regard to signaling may be forwarded to the over-the-top application analyzer module by a protocol stack or rather a protocol tester which may be assigned to the network simulator. Hence, the network simulator may also forward information with regard to signaling In addition, information regarding the application may be forwarded to the over-the-top application analyzer module by the deep packet inspection engine and/or the application running on the device under test, for instance the application name, throughput, the protocols used such as security protocols.

Generally, the application running on the device under test may also forward information regarding the device under test and its vulnerabilities.

The power consumption measurement device may be configured to collect power consumption data of the device under test. Therefore, the power consumption measurement device monitors and gathers information which may be forwarded to the over-the-top application analyzer module for analyzing purposes so as to identify a security threat.

The information regarding the power consumption of the device under test may be forwarded to the over-the-top application analyzer module via the power consumption measurement device that is connected to the device under test.

Generally, the deep packet inspection engine may be configured to collect information regarding IP packets during the connection. Hence, the deep packet inspection engine can gather information regarding IP packets exchanged between the device under test and the network simulated by the network simulator. Thus, the throughput can be determined.

For instance, the device under test is connected to the internet via the network simulator. Thus, the deep packet inspection engine may collect the information regarding the IP packets that are exchanged between the device under test and the internet during the connection of the device under test with the internet during the testing. Moreover, communication with external server may be identified.

The connection of the device under test to the internet via the network simulator ensures that a live network is provided so as to identify external servers and/or systems involved in the security attack(s) simulated.

The respective servers and/or systems may be identified by the deep packet inspection engine.

Furthermore, the network simulator may be configured to execute at least one penetration test on the device under test, namely a simulated attack. Thus, the behavior of the device under test can be verified appropriately while simulating an attack on the device under test.

The penetration test is also called pen test. It is an authorized simulated attack that is performed to evaluate the security of the device under test, for example an application running on the device under test. Generally, the penetration test is performed to identify both vulnerabilities, including the potential for unauthorized parties to gain access to features of the device under test and data, as well as strengths, enabling a full risk assessment to be completed.

The test results of the at least one penetration test are collected. The respective test results may be forwarded to the over-the-top application analyzer module that takes the test results into account for identifying security vulnerabilities of the device under test so as to identify a security threat.

Furthermore, the network simulator may comprise at least one of a protocol tester, a protocol stack, and the over-the-top application analyzer module. Thus, the OTT application analyzer module may be integrated in the network simulator. For instance, the OTT application analyzer module is an application running on the network simulator or rather a software module.

The OTT application analyzer module may be assigned to the protocol stack which may relate to a certain telecommunication standard, for instance 3G, 4G, LTE, 5G and/or NG.

Alternatively, the OTT application analyzer module is assigned to another processing device, for instance a computer. The OTT application analyzer module may run on the respective processing device that is part of the test system. For example, the other components of the test system may be connected with the processing device so as to forward the respective information. In a simple way, the respective processing device is integrated in the network provided by the network simulator.

Generally, an OTT application is an application that receives data over the internet which is not directly submitted by the respective internet service provider of the device under test. Such an OTT application is more vulnerable for attacks as it communicates with (external) servers belonging to other companies or rather run by other companies than the internet service provider.

Therefore, the respective application running on the device under test may be an OTT application.

In general, the test system as well as the method are used to simulate respective attacks on the device under test while using the at least one penetration test module assigned to the network module.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
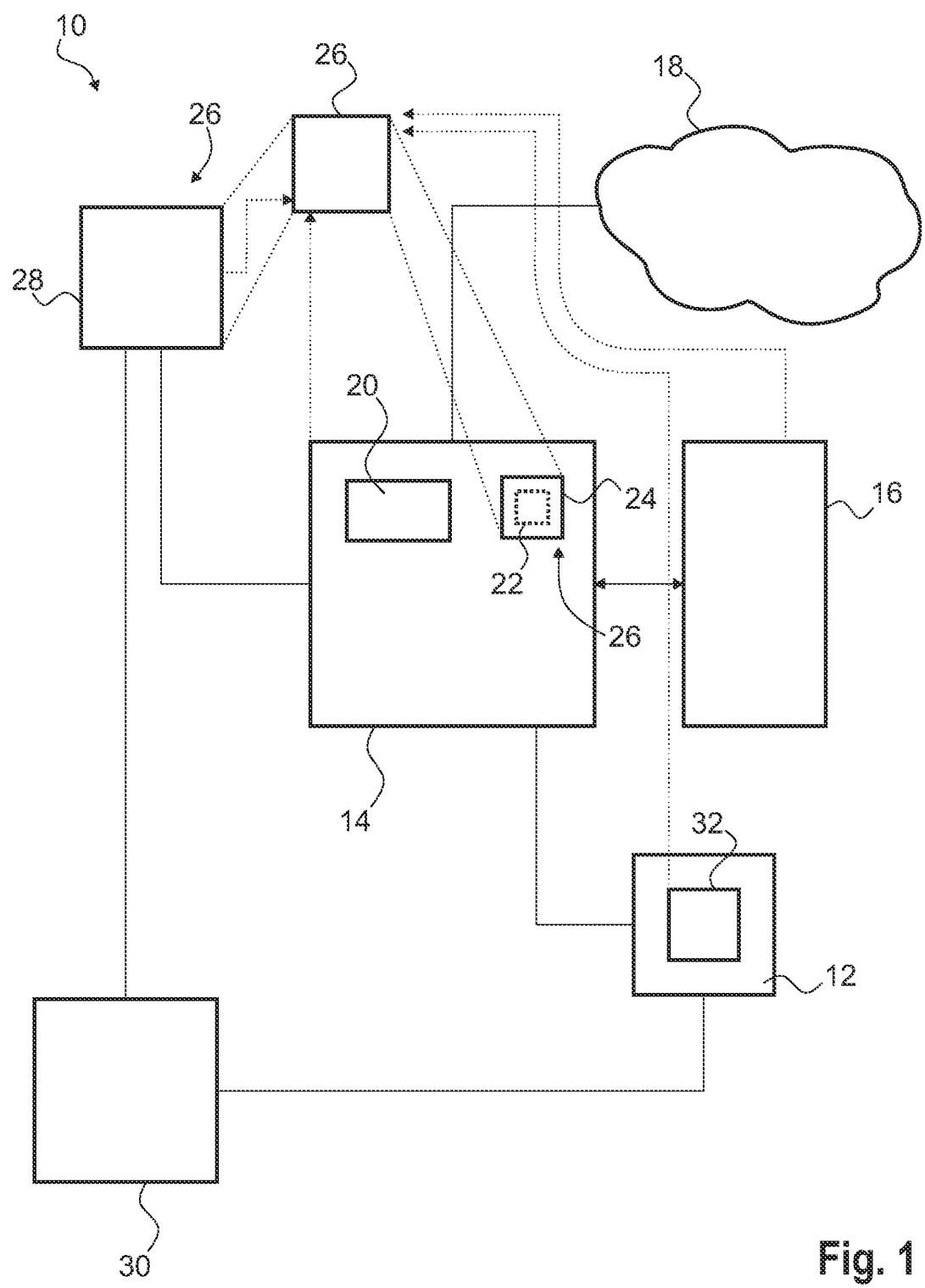
FIG. 1 schematically shows an overview of a test system according to an aspect of the present disclosure.

FIG. 1 illustrates a representative example of a test system 10 for identifying security vulnerabilities of a device under test 12. The device under test 12 is part of the test system 10 that also comprises a network simulator 14 which is connected to the device under test 12.

The network simulator 14 is connected with a deep packet inspection engine 16 that is configured to monitor IP traffic that occurs between the device under test 12 and the internet 18 wherein the network simulator 14 simulates a certain network environment via which a connection between the device under test 12 and the internet 18 is established. In addition, the network simulator 14 comprises at least one penetration test module 20 that is configured to perform at least one penetration test on the device under test 12 so as to simulate an attack on the device under test 12 for identifying security vulnerabilities of the device under test 12. In addition, the network simulator 14 may comprise a protocol tester 22 or rather a protocol stack 24.

The protocol stack 24 may comprise an over-the-top application analyzer module 26 as will be described later. Alternatively, the over-the-top application analyzer module 26 is assigned to a processing device 28 such as a computer. Both alternatives are shown in FIG. 1 by the dashed lines.

The test system 10 also has a power consumption measurement device 30 that is connected to the device under test 12 so as to monitor the power consumption of the device under test 12 during the testing.

On the device under test 12 itself, an application 32 is running that is connected to the over-the-top application analyzer module 26 so as to exchange data between the application 32 and the over-the-top application analyzer module 26.

In fact, the over-the-top application analyzer module 26 receives information from all components of the test system 10 as indicated by the dashed lines as will be explained hereinafter.

Therefore, the application 32 running on the device under test 12 is an application that is used for data collection wherein the data collected by the application 32 is forwarded to the over-the-top application analyzer module 26 that is also adapted to execute the application 32 on the device under test 12. Thus, the over-the-top application analyzer module 26 is adapted to control the data to be retrieved by the application.

The information that is forwarded by the application 32 to the over-the-top application analyzer module 26 may be forwarded through the network simulator 14 so that the (additional) IP traffic may be monitored by the deep packet inspection engine 16.

Since the over-the-top application analyzer module 26 receives the respective information from all components of the test system 10, the over-the-top application analyzer module 26 is configured to receive inter alia information regarding at least one of IP security, cyber security attack, signaling, application, the device under test and its vulnerabilities as well as power consumption.

In fact, the over-the-top application analyzer module 26 analyzes the information provided by the respective components of the test system 10 such as power consumption, network signaling information, deep packet inspection as well as results from the simulated attacks forwarded to the OTT application analyzer module 26 via the application 32 running on the device under test 12.

The over-the-top application analyzer module 26 is generally configured to correlate all the information gathered by the components of the test system 10, namely from the network simulator 14, the deep packet inspection engine 16, the power consumption measurement device 30 as well as the application 32 running on the device under test 12 so as to identify an abnormal behavior of the device under test 12 from an expected behavior which is known and may be stored, for instance on the processing device 28 and/or the network simulator 14.

Hence, the conditions applied or rather identified by the over-the-top application analyzer module 26 are taken into account in order to compare the respective information gathered with information known. For this purpose, the over-the-top application analyzer module 26 correlates all the information gathered.

The respective conditions may comprise at least one of network operation parameters used by the network simulator 14 which can be set by an operator of the test system 10, power consumption data as well as data throughput which are collected by the power consumption measurement device 30 and the deep packet inspection engine 16 respectively.

Upon the comparison of, the over-the-top application analyzer module 26 is adapted to identify a security threat assigned to the device under test 12, for example with regard to the (OTT) application 32.

As the device under test 12 is connected to the internet 18 via the network simulator 14, a live network is provided. Thus, external servers or rather systems involved in the (simulated) attack may be identified by the test system 10, for example the deep packet inspection engine 16. The respective servers and/or systems may be identified by their IP addresses due to the deep packet inspection engine 16 connected to the network simulator 14.

The security threat may be at least one of spoofing of personal data information and communication to a server in the internet 18 trying to make the device under test 12 an internet bot.

The application 32 running on the device under test 12 is a dedicated application used for testing the device under test 12 with regard to security vulnerabilities. Hence, the application 32 is a testing application.

The relevant information of the device under test 12 is collected via the application 32 that is used to identify a vulnerability of the device under test 12, a file system communicating with the device under test 12 or any other system communicating with the device under test 12. Therefore, the application 32 may be an over-the-top application.

The device under test 12 may be a user end device, a file system or any other communication system that may be connected to the internet or to any other communication device.

Figure 2:
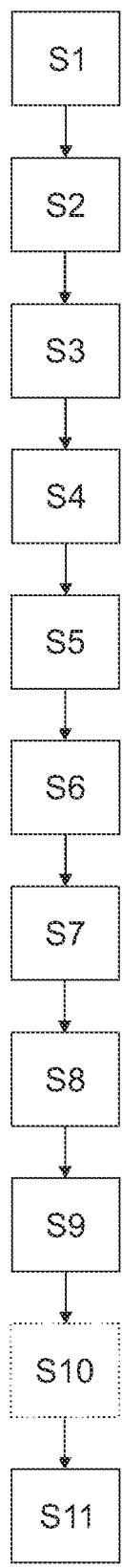
FIG. 2 schematically shows a flow-chart illustrating an example of a method according to an aspect of the present disclosure.

In FIG. 2, a flow-chart of a representative embodiment of the method for identifying security vulnerabilities of the device under test 12 is shown. In a first step (S1), the respective test system 10 is set up by providing all the components of the test system 10 and connecting them with each other.

In fact, the device under test 12 is connected to the network simulator 14, for instance via a wireless connection such as a radio frequency connection. The device under test 12 is also connected to the power consumption measurement device 30, for instance via a line. The network simulator 14 is connected to the internet 18 as well as the deep packet inspection engine 16 assigned to the network simulator 14.

If the processing device 28 is provided, the respective components are also connected to the processing device 28, namely the network simulator 14 and the power consumption measurement device 30.

In a second step (S2), the application 32 is installed on the device under test 12. The application 32 is configured to extract critical information from the device under test 12, for instance device operating system information, system directories, build, version, permissions to different resources, and so on. This provides a first information set. The respective information sets will be used by the over-the-top application analyzer module 26 as will be described later.

In a third step (S3), the device under test 12 is connected to the internet 18 via the network simulator 14, for example the network simulated.

In a fourth step (S4), the at least one penetration test module 20 is executed so as to simulate an attack on the device under test 12. The at least one penetration test module 20 may be executed by the network simulator 14.

In a fifth step (S5), the respective test results of the penetration test are gathered, for instance via open network ports, SQL injections and/or brute force. This results in a second information set.

In a sixth step (S6), information regarding IP packets (exchanged) during the connection is gathered by using the deep packet inspection engine 16. This results in a third information set.

In a seventh step (S7), power consumption data of the device under test 12 are gathered by the power consumption measurement device 30. This results in a fourth information set.

In a eighth step (S8), signaling protocol information is gathered by the network simulator 14. This results in a fifth information set.

In a ninth step (S9), operator specific network parameter are gathered by the network simulator 14. This results in a sixth information set.

The respective information sets gathered may be forwarded to the over-the-top application analyzer module 26 directly when they are gathered in the steps mentioned above. Alternatively, the respective information sets gathered are submitted in a collected manner in a tenth step (S10).

In any case, the respective information sets are collected by the over-the-top application analyzer module 26.

In a eleventh step (S11), the over-the-top application analyzer module 26 correlates all the information received, namely the information from all information sets, so as to identify an abnormal behavior of the device under test 12 under these conditions and to identify at least one security threat.

In fact, the abnormal behavior of the device under test 12 is recognized by comparing the information collected (and correlated) with known information. Put it another way, the information gathered is used as parameters which are compared with known parameters.

Hence, at least one pattern with regard to the information retrieved is generated that is compared to known patterns. In case deviations are found, a security threat may be identified.

For instance, the device under test 12 is a user equipment such as a tablet, a mobile phone or a smartphone.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system for identifying security vulnerabilities of a device under test, comprising:
 a device under test, wherein the device under test is a mobile user end device;
 a network simulator connected to the device under test via a radio frequency connection, the network simulator comprising at least one penetration test module configured for performing at least one penetration test in order to simulate an attack on the device under test, the network simulator being configured to define network conditions under which the device under test is tested;
 a deep packet inspection engine connected to the network simulator for monitoring IP traffic;
 a power consumption measurement device connected to the device under test for monitoring the power consumption of the device under test during the respective attack simulated; and
 an over-the-top application analyzer module,
 the over-the-top application analyzer module being adapted to gather information from at least one of the device under test, the network simulator, the deep packet inspection engine, and the power consumption measurement device when the attack on the device under test is simulated,
 the over-the-top application analyzer module being adapted to correlate all information gathered to identify an abnormal behavior of the device under test from expected behavior under the conditions applied and to identify at least one security threat, thereby identifying security vulnerabilities of the device under test.

2. The test system according to claim 1, wherein the conditions applied are selected from a group consisting network operating parameters, power consumption, and data throughput.

3. The test system according to claim 1, wherein the security threat comprises at least one of spoofing of personal data information and communication to a server trying to make the device under test an internet bot.

4. The test system according to claim 1, wherein an application is provided that runs on the device under test.

5. The test system according to claim 4, wherein the application is an application configured for data collection.

6. The test system according to claim 4, wherein the over-the-top application analyzer module is adapted to execute the application on the device under test.

7. The test system according to claim 4, wherein the application forwards information through the network simulator to the over-the-top application analyzer module.

8. The test system according to claim 1, wherein the over-the-top application analyzer module is adapted to receive information from at least one of the deep packet inspection engine, the network simulator, the power consumption measurement device, and the application.

9. The test system according to claim 1, wherein the over-the-top application analyzer module is adapted to receive information regarding at least one of IP security, cyber security attack, signaling, application, the device under test and its vulnerabilities, and power consumption.

10. The test system according to claim 1, wherein the power consumption measurement device is configured to collect power consumption data of the device under test.

11. The test system according to claim 1, wherein the deep packet inspection engine is configured to collect information regarding IP packets during the connection.

12. The test system according to claim 1, wherein the device under test is connected to the internet via the network simulator.

13. The test system according to claim 1, wherein the network simulator is configured to execute at least one penetration test on the device under test.

14. The test system according to claim 13, wherein the test results of the at least one penetration test are collected.

15. The test system according to claim 1, wherein the network simulator comprises at least one of a protocol tester, a protocol stack, or the over-the-top application analyzer module.

16. A method for identifying security vulnerabilities of a device under test, with the following steps:
 providing a test system for identifying security vulnerabilities of a device under test, the test system comprising a device under test that is a mobile user end device, a network simulator connected to the device under test via a radio frequency connection, a deep packet inspection engine connected to the network simulator for monitoring IP traffic, a power consumption measurement device connected to the device under test for monitoring the power consumption of the device under test, and an over-the-top application analyzer module, wherein the network simulator comprises at least one penetration test module for performing at least one penetration test;
 performing at least one penetration test on the device under test in order to simulate an attack on the device under test, the network simulator defining network conditions under which the device under test is tested;
 monitoring the power consumption of the device under test during the respective attack simulated;
 collecting information from at least one of the device under test, the network simulator, the deep packet inspection engine, and the power consumption measurement device when the attack on the device under test is simulated; and
 analyzing the information so as to identify an abnormal behavior of the device under test from expected behavior under the conditions applied and to identify at least one security threat, thereby identifying security vulnerabilities of the device under test.

17. The method according to claim 16, wherein an application is running on the device under test.

18. The method according to claim 16, wherein the over-the-top application analyzer module receives information from at least one of the deep packet inspection engine, the network simulator, the power consumption measurement device, or the application.

19. The method according to claim 16, wherein the over-the-top application analyzer module receives information regarding at least one of IP security, cyber security attack, signaling, application information, the device under test and its vulnerabilities, or power consumption, the over-the-top application analyzer module processing and analyzing the information received in order to identify an abnormal behavior of the device under test from expected behavior under conditions applied and to identify at least one security threat.

20. A test system for identifying security vulnerabilities of a device under test, comprising:
 a device under test, wherein the device under test is a mobile user end device, wherein an over-the-top application is provided that runs on the device under test;
 a network simulator connected to the device under test, the network simulator comprising at least one penetration test module configured for performing at least one penetration test in order to simulate an attack on the device under test, the network simulator being configured to define network conditions under which the device under test is tested;

a deep packet inspection engine connected to the network simulator for monitoring IP traffic;

a power consumption measurement device connected to the device under test for monitoring the power consumption of the device under test during the respective attack simulated; and an over-the-top application analyzer module, the over-the-top application analyzer module being adapted to gather information from at least one of the device under test, the network simulator, the deep packet inspection engine, and the power consumption measurement device when the attack on the device under test is simulated, the over-the-top application analyzer module being adapted to correlate all information gathered to identify an abnormal behavior of the device under test from expected behavior under the conditions applied and to identify at least one security threat, thereby identifying security vulnerabilities of the over-the-top application running on the device under test.

* * * * *